(12) United States Patent
Yang

(10) Patent No.: US 11,741,075 B2
(45) Date of Patent: Aug. 29, 2023

(54) METHODS AND SYSTEM OF TRACKING TRANSACTIONS FOR DISTRIBUTED LEDGER

(71) Applicant: Oracle International Corporation, Redwood Shores, CA (US)

(72) Inventor: Baohua Yang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 64 days.

(21) Appl. No.: 16/893,197

(22) Filed: Jun. 4, 2020

(65) Prior Publication Data
US 2021/0382870 A1 Dec. 9, 2021

(51) Int. Cl.
G06F 16/23 (2019.01)
H04L 9/32 (2006.01)
G06Q 10/1093 (2023.01)

(52) U.S. Cl.
CPC ........ *G06F 16/2365* (2019.01); *H04L 9/3268* (2013.01); *G06Q 10/1097* (2013.01)

(58) Field of Classification Search
None
See application file for complete search history.

(56) References Cited

U.S. PATENT DOCUMENTS

| | | | |
|---|---|---|---|
| 6,526,433 B1 * | 2/2003 | Chang | G06F 11/0709 709/224 |
| 6,889,244 B1 * | 5/2005 | Gaither | G06F 9/54 709/213 |
| 11,269,859 B1 * | 3/2022 | Luedtke | G06F 16/245 |
| 2003/0050972 A1 * | 3/2003 | Felt | G06Q 30/06 714/15 |
| 2017/0155743 A1 * | 6/2017 | Sukhija | G06F 9/5027 |

(Continued)

OTHER PUBLICATIONS

Wozniak, Jan, "What's the best Ethereum block explorer? 10 Alternatives to Etherscan", dated Jan. 10, 2019, 18 pages.

(Continued)

*Primary Examiner* — Irene Baker
(74) *Attorney, Agent, or Firm* — Hickman Becker Bingham Ledesma LLP; Brian N. Miller

(57) ABSTRACT

A tracker computer does not contribute content for inclusion in: a distributed ledger, a transaction, and a blockchain that records the transaction. In an embodiment that reduces network bandwidth needed by a blockchain network, the tracker computer receives, from first client computers, requests to track execution of transactions in a blockchain network that has multiple ledger computers and does not include the tracker computer. The tracker computer subscribes to the ledger computers for status notifications from the execution of the transactions. The tracker computer receives status notifications that indicate status of the transactions that occurred after the clients' subscribing for status notifications. The tracker computer records the status of the transactions. The tracker computer pushes the status of the transactions to the first client computers. From second client computers, the tracker computer receives pull requests for status of the transactions in the blockchain network. To the second client computers, the tracker computer sends the status of the transactions as already recorded by the tracker computer.

18 Claims, 5 Drawing Sheets

DISTRIBUTED SYSTEM 100

(56) References Cited

U.S. PATENT DOCUMENTS

| | | | |
|---|---|---|---|
| 2018/0060145 A1* | 3/2018 | Jaiswal | G06F 9/546 |
| 2018/0117447 A1* | 5/2018 | Tran | G06Q 20/382 |
| 2019/0102409 A1* | 4/2019 | Shi | H04L 41/5054 |
| 2019/0273739 A1* | 9/2019 | Pemmaraju | H04L 63/1416 |
| 2020/0005284 A1* | 1/2020 | Vijayan | H04L 63/08 |
| 2020/0117690 A1* | 4/2020 | Tran | G06F 16/90332 |
| 2020/0128023 A1* | 4/2020 | Guan | H04L 63/123 |
| 2020/0233866 A1* | 7/2020 | Dai | H04L 9/50 |
| 2020/0374340 A1* | 11/2020 | Novotny | H04L 67/1042 |

OTHER PUBLICATIONS

Matic Blog, "Understanding Dagger", https://blog.matic.network/understanding-dagger/, dated Feb. 16, 2018, 4 pages.

Lorenzo, Phillip, "Meet Etherscan", www.Sweetcode.com, dated 2018, 6 pages.

Kanani, Jaynti, "What is Matic Network?", https://medium.com/matic-network/what-is-matic-network, dated May 25, 2018, 18 pages.

Kanani, Jaynti, "Ethereum in realtime: Dagger", https://medium.com/matic-network/ethereum-in-realtime-dagger-98ee2d717c76, dated Dec. 6, 2017, 3 pages.

Hyperledger, "Hyperledger Architecture, vol. II", Small Contracts, dated Apr. 2018, 14 pages.

Hyperledger, "Hyperledger Architecture, vol. 1", dated Aug. 2017, 15 pages.

Hyperledger, "An Introduction to Hyperledger", dated Aug. 2018, 33 pages.

Han et al., "On the Performance of Distributed Ledgers for Internet of Things", dated Jul. 26, 2019, 17 pages.

Lorenzo, Phillip, "Meet Etherscan Sweet", Etherscan, Blockchain, Sweetcode.io, dated Jun. 5, 2020, 6 pages.

Arjun, Anurag, "How to get real-time updates from Ethereum in your favorite apps", https://medium.com/matic-network/how-to-get-real-time-updates-for-ethereum-in-your-favorite-apps, Aug. 6, 2018, 10 pages.

"Matic Network", dated Nov. 14, 2019, 5 pages.

* cited by examiner

METHODS AND SYSTEM OF TRACKING TRANSACTIONS FOR DISTRIBUTED LEDGER

RELATED CASE

Incorporated in its entirety herein is U.S. patent application Ser. No. 16/141,337 "System and method for managing a blockchain cloud service" filed Sep. 25, 2018 by Pierce Shi et al. on behalf of Oracle International Corporation.

FIELD OF THE INVENTION

The present invention relates to blockchain monitoring. Herein are techniques that reduce network bandwidth needed by a blockchain network to provide transaction status on demand or on a continuing basis.

BACKGROUND

Emerging blockchain network and distributed ledger technology lets multiple parities collaborate for transactions in more efficient ways. A blockchain network contains multiple ledger computers that collectively maintain a distributed ledger of transactions. The distributed ledger is a high integrity and cryptographically protected log of transactions.

Transactions can be sent to any ledger computer, and a unique and consensus view will be achieved and propagated among all members of a blockchain network. Because of the distributed ledger, there is no central mechanism to track the status of the transaction, such as whether the transaction is committed, lost, or abandoned.

There are two existing solutions for this problem:
1. Each ledger computer stores status of all transactions for querying by clients. This is popular in public blockchains such as Bitcoin and Ethereum; or
2. Each ledger computer exposes an event notification application programing interface (API) and, when each client computer receives an event, the client computer must update its local transaction status record or else details of the event may become more or less unavailable. This is popular in consortium blockchains such as Hyperledger Fabric.

Both approaches have shortcomings. For (1) above, each client must query every transaction from a ledger computer, which greatly increases the ledger computer's workload. For (2) above, each client must maintain a streaming connection with a ledger computer that consumes much network bandwidth, especially when there are many clients, and consumes that ledger computer's CPU resource. In either case, the ledger computers of the blockchain network suffer increased resource consumption and decreased throughput. Load balancing between multiple ledger computers may be difficult or impossible. Without load balancing, throughput of the blockchain network is further decreased.

DETAILED DESCRIPTION

Figure 1:
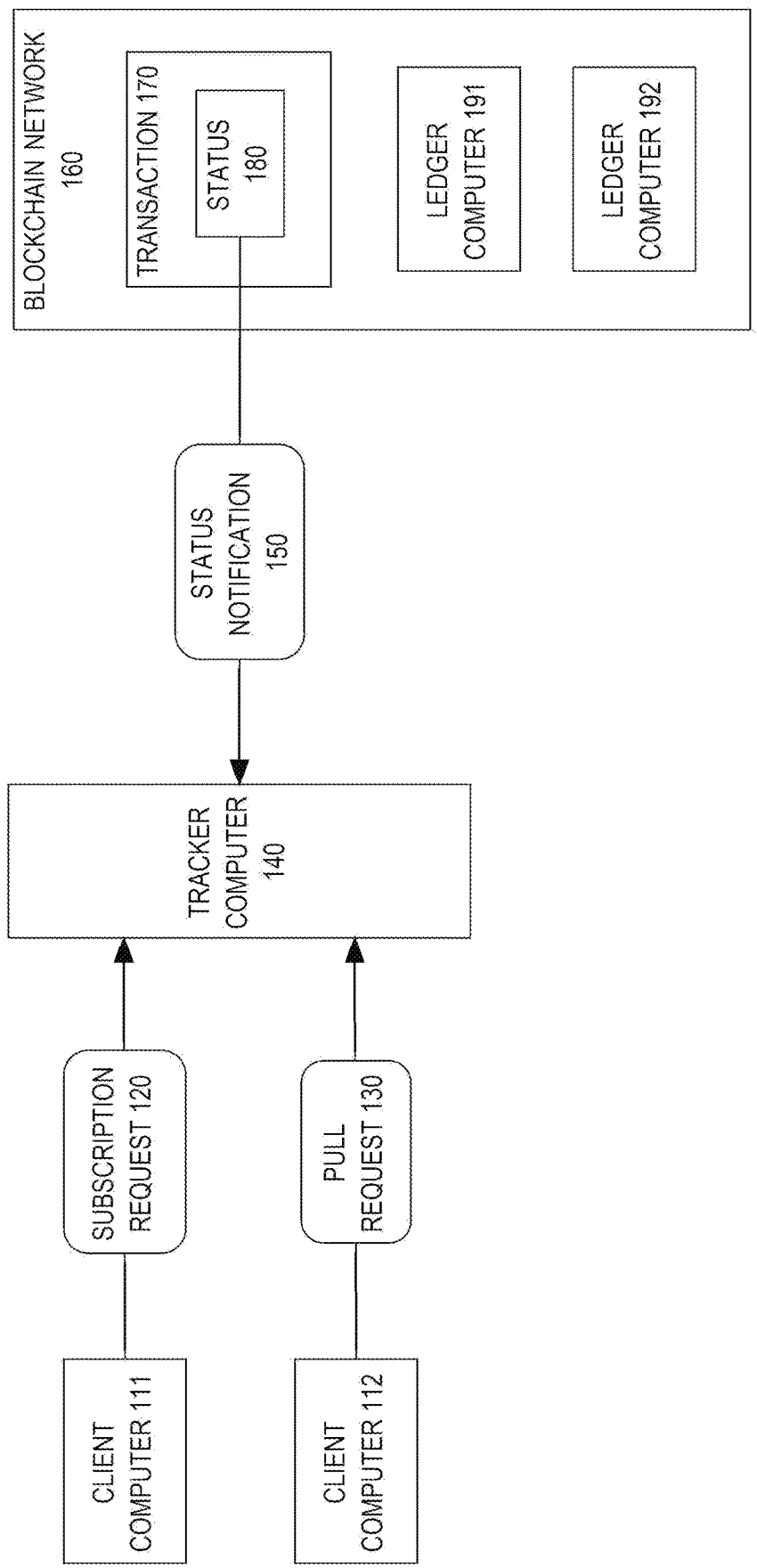
FIG. 1 is a block diagram that depicts an example distributed system that offloads, from a blockchain network to a tracking computer, responsibility of delivering status of transactions to client computers.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is a Transaction Tracking System (TTS), which offloads work, from both client and blockchain network, for delivering status of a transaction. Large numbers of clients ordinarily may dominate a ledger computer's resource consumption. Approaches herein reduce workload at the ledger computer because the ledger computer does not report transaction statuses to all clients, but instead delivers such statuses only to a tracker computer of the TTS. The tracker computer is responsible for caching and/or relaying transaction statuses to the clients.

The tracker computer does not contribute content for inclusion in: a distributed ledger, a transaction, and a blockchain that records the transaction. The tracker computer is not involved with maintaining the integrity of the distributed ledger such as: deciding the validity of new transactions or imposing or enforcing a lifecycle on existing transactions. In an embodiment, the tracker computer is more or less a cache and distributor of current and/or past statuses of transactions.

When scaling to large numbers of clients and/or large numbers of transactions, no other blockchain distributed ledger can withstand demand spikes and sustain throughput as well as approaches herein. Techniques herein are suitable for implementation in many distributed ledger productions.

TTS provides two types of application programing interfaces (APIs): a RESTful API and a blockchain network native API.

With the RESTful API, the client can:
Query the status of the transactions instead of using an existing blockchain explorer;
Proactively update transaction status on an ongoing basis in a client's local database by reporting to a given client callback API.

With a blockchain network native API, the client can subscribe for status notification from the TTS using a same event notification API that may also be provided by a ledger computer.

In an embodiment, a tracker computer receives, from first client computer(s), request(s) to track execution of transaction(s) in a blockchain network that has multiple ledger computers and does not include the tracker computer. The tracker computer subscribes to the ledger computers for status notifications from the execution of the transactions. The tracker computer receives status notifications that indicate status of the transactions that occurred after the clients' subscribing for status notifications. The tracker computer records the status of the transactions. The tracker computer pushes the status of the transactions to the first client computers. From second client computer(s), the tracker computer receives pull request(s) for status of the transactions in the blockchain network. To the second client computers, the tracker computer sends the status of the transactions as already recorded by the tracker computer.

1.0 Example Distributed System

FIG. 1 is a block diagram that depicts an example distributed system 100, in an embodiment. Distributed system 100 offloads, from blockchain network 160 to tracker computer 140, responsibility of delivering status 180 of transaction 170 to client computers 111-112. Each of computers 111-112, 140, and 191-192 may be a rack server such as a blade, a personal computer, a mainframe, a virtual computer, a smartphone, or other computing device.

Computers 111-112 and 191-192 are permanently or intermittently connected to tracker computer 140 by a communication network or an internetwork of multiple communication networks. In an embodiment, tracker computer 140 resides in a data center, and ledger computers 191-192 reside in other data center(s). In an embodiment, tracker computer 140 uses a wide area network (WAN) to communicate with ledger computers 191-192.

In an embodiment, client computers 111-112 are laptops or smartphones that are mobile and wirelessly communicate to tracker computer 140 and/or to an internetwork. For example when client computer 111 is a smartphone, it may sometimes be offline such as due to lost radio signal, airplane mode, drained battery, or powered down. Temporary unavailability of client computer 111 is tolerated as discussed later herein.

Blockchain network 160 is a system of record for verifiable transactions such as 170. Blockchain network 160 persistently stores many blockchains, and each blockchain is a linked list of blocks. Each block may contain multiple transactions such as 170. Each block contains cryptographic hash codes that ensure integrity of: a) individual transactions within the block, and b) logical linkage of the block within the linked list of blocks.

Redundancy makes blockchain network 160 reliable as follows. Blockchain network 160 contains multiple ledger computers, such as 191-192, that may each persistently store clones of some or all blockchains. For example, blockchain network 160 may operate as a distributed ledger of blockchains. Additional details on configuring and operating blockchains, blocks, and blockchain networks are presented in related U.S. patent application Ser. No. 16/141,337.

The distributed ledger is fault tolerant based on consensus of participating ledger computers. For example, consensus as to status of a blockchain, block, or transaction 170 such as status 180 may entail voting based on a majority and/or a quorum. For example, blockchain network 160 can report status 180, such as with status notification 150, even when a minority of ledger computers are unavailable, have stale data, or accidentally or maliciously provide inaccurate data.

Client computer 111 or 112 or some other computer may submit transaction 170 to blockchain network 160 for recordation. That is, blockchain network 160 receives, executes, and records transaction 170 but does not originate transaction 170. For example, transaction 170 may be an order to logically transfer an identified resource, such as an amount of cryptocurrency, from one owner to another. For example, origination of transaction 170 may entail multiple parties and/or multiple computers.

Even after transaction 170 is submitted to blockchain network 160, the lifecycle of transaction 170 may have several possible sequential phases or failure modes. For example, status 180 may be temporary and replaced with other status(s) at other time(s) for same transaction 170. Some examples of status 180 include pending/unconfirmed, successful/confirmed, or failed/rejected.

Blockchain network 160 generates and sends status notification 150 that contains an indication of status 180. Depending on the embodiment and/or scenario, blockchain network 160 may: a) generate and send status notification 150 as soon as the status of transaction 170 changes to status 180, b) buffer and eventually send status notification 150 such as batched with statuses of other transactions, and/or c) send status notification 150 on demand when eventually externally requested.

With other approaches, blockchain network 160 may be responsible for individually delivering status notifications on demand or on a continuing basis to many client computers for same or different transactions. In such other approaches, blockchain network 160 typically needs substantial network throughput and/or processor throughput for such delivery of status notifications. For example, blockchain network 160's status delivery responsibilities may be shouldered by some or all of the ledger computers without load balancing.

In any case with such other approaches, blockchain network's status delivery responsibilities may somewhat starve blockchain network 160 of bandwidth needed for actual transaction processing. For example, capacity planning for such other approaches may require financially expensive over-provisioning of: an amount of network bandwidth and/or an amount of ledger computers. With such other approaches, insufficient capacity may slow or fail transactions.

Such technical problems are solved herein by offloading, from blockchain network 160 to tracker computer 140, responsibility for delivering statuses of transactions to client computers 111-112. Herein, blockchain network 160 sends status notifications such as 150 only to tracker computer 140 that then relays those status notifications to client computers 111-112 according to criteria and timing provided by client computers 111-112. For example, tracker computer 140 may relay status notification 150, as is or reformatted, to none, one, or both of client computers 111-112 at a same or different time.

Client computer 112 may immediately demand status(es) of transaction(s) by sending pull request 130 to tracker computer 140 that may contain transaction filter criteria such as: transaction identifier(s), identifiers of block(s) or blockchain(s), a time or time period of transaction submission and/or transaction status change, transaction status(es), details of the subject matter of the transaction(s), and/or a party identifier such as for an owner, client, or counterparty. For example, pull request 130 may seek status of this week's purchases of oranges that originated from client computer 112 or the current client computer and that successfully or unsuccessfully finished today.

If status notification 150 occurred before pull request 130, and pull request 130 matches pull request 130, then tracker computer 140 immediately or eventually relays status notification 150, as is or reformatted, to client computer 112. Depending on the embodiment, tracker computer 140 keeps status notification 150, as is or reformatted, in volatile and/or nonvolatile storage. Depending on the embodiment, tracker computer 140 keeps: all past status notifications, recent status notifications, or only a most recent status notification of each transaction. In an embodiment, each transaction is stored in its own row in a relational table that has status columns only for a most recent status notification and additional columns that describe the transaction itself. In an embodiment, status notifications are stored in a round robin database, such as for time series data, or an append only database.

In embodiments, party identity may be specified personally by name and/or password, digital certificate, or cryptographic signature, or impersonally by: a) a unique address such as for internet protocol (IP) or media access control (MAC) such as for a network interface card (NIC), b) a universal resource identifier (URI) such as a universal resource locator (URL), c) a digital fingerprint of a device or web browser, d) a serial number of hardware such as a CPU, e) dedicated cryptographic hardware such as a dongle or smart card, and/or f) a telephone number.

In embodiments, pull request 130 may comprise a database statement such as structured query language (SQL) and open database connectivity (ODBC), an email, a telephonic text message such as short message service (SMS), a semi-structured document such as JavaScript object notation (JSON) or extensible markup language (XML), a remote procedure call (RPC) and/or a simple object access protocol (SOAP) message, a hypertext transfer protocol (HTTP) request such as: GET, POST, common gateway interface (CGI), and/or representational state (REST).

Depending on the scenario, client computer 112 may send pull request 130 on demand such as ad hoc or otherwise interactive, at a particular scheduled time such as by calendar, timer or repeating interval timer, and/or according to an automation conditional trigger that is hosted on client computer 112 such as a script or a database trigger.

In a typical worst case, blockchain network 160 may need days to complete transaction 170 due to a bottleneck within the transaction processing pipeline of blockchain network 160 such as distributed coordination latency cause by too many ledger computers or too few that may temporarily prevent a quorum. For example, sending a pull request for a same transaction every five minutes may be wasteful such as stressful on tracker computer 140's network, processor, or disk.

In an embodiment, client computer 111 sends subscription request 120 to tracker computer 140 to request status notification(s) that might occur in the future. Subscription request 120 may be more or less similar to pull request 130 as to filter criteria, encoding, and/or transport. If status notification 150 matches the criteria of subscription request 120, then tracker computer 140 immediately or eventually publishes status notification 150, as is or reformatted, to client computer 111 and, at same or different times, to other client computers whose already submitted subscription requests match status notification 150.

2.0 Example Status Delivery Process

Figure 2:
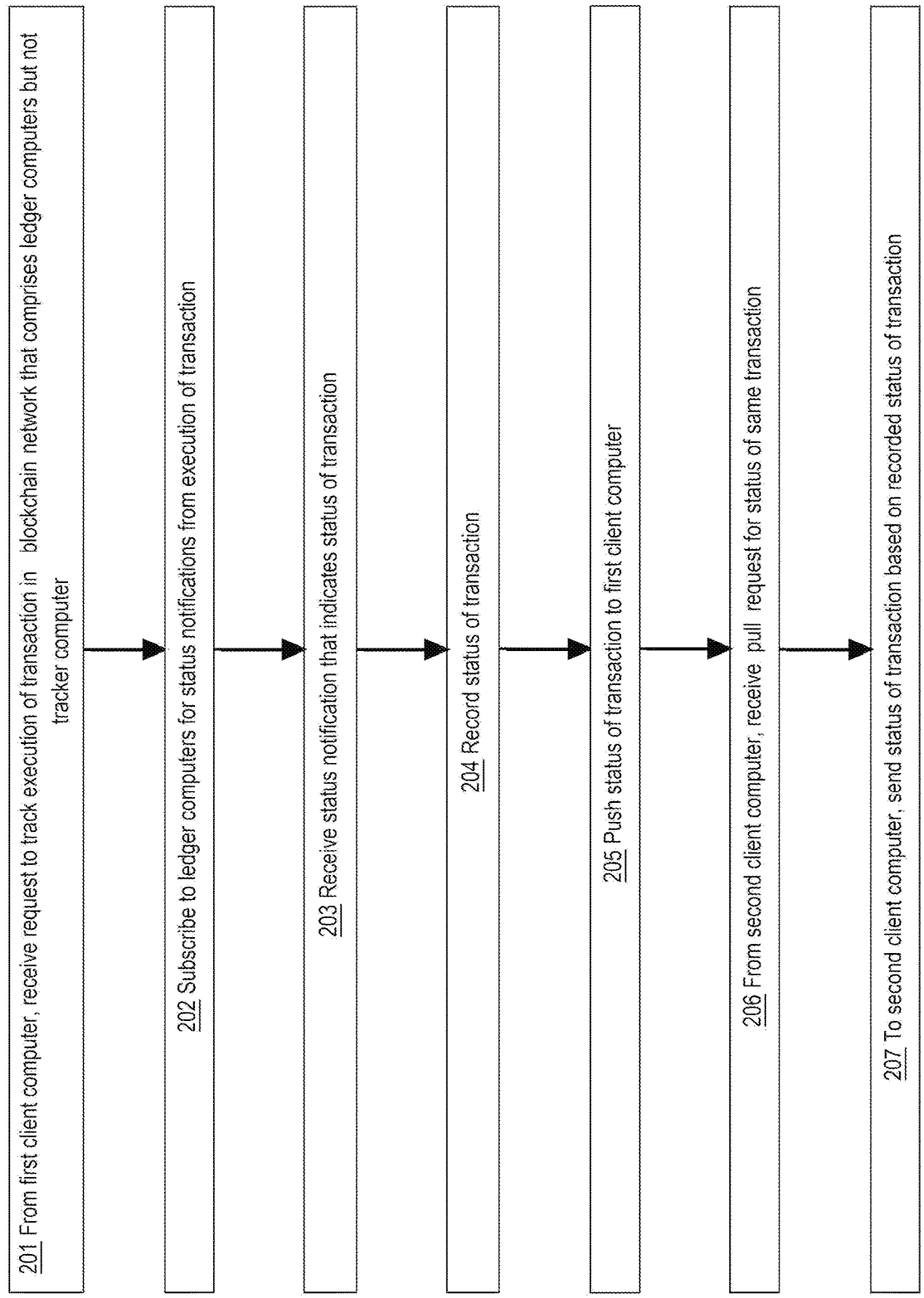
FIG. 2 is a flow diagram that depicts an example computer process that that offloads, from a blockchain network to a tracking computer, responsibility of delivering status of transactions to client computers.

FIG. 2 is a flow diagram that depicts an example process for tracker computer 140 to offload, from blockchain network 160, responsibility of delivering status 180 of transaction 170 to client computers 111-112. FIG. 2 is discussed with reference to FIG. 1. All of steps 201-207 are performed by tracker computer 140.

From client computer 111, step 201 receives subscription request 120 to track execution of transaction 170 in blockchain network 160 that comprises ledger computers 191-192 but not tracker computer 140. Responsively, step 202 subscribes to one, some, or all ledger computers 191-192 for future status notifications of transaction 170.

Much time may elapse between steps 202-203. For example, a status of transaction 170 might not change for a long time. Step 203 receives status notification 150 that indicates status 180 of transaction 170.

Step 204 records status notification 150 and/or status 180 of transaction 170. Recordation may occur in volatile and/or nonvolatile storage. Recordation may be needed for step 207 as explained below.

Step 205 pushes some form of status notification 150 and/or status 180 of transaction 170 to subscribed client computers such as 111. In various embodiments, the push may entail: HTTP streaming (a.k.a. HTTP/2 server push), automatic periodic polling by client computer 111, instant messaging, email, persistent HTTP connectivity such as pushlet, or wireless application protocol (WAP) push. In a peer to peer embodiment, tracker computer 140 initiates a socket connection to client computer 111 so long as client computer 111 can listen for and accept the socket connection.

In a client server embodiment, client computer 111 instead initiates the socket connection, either periodically by polling or persistently with keep alives. With peer to peer, tracker computer 140 may send transaction status to client computer 111 in an HTTP request. With client server, tracker computer 140 may send transaction status to client computer 111 in an HTTP response.

Much time may elapse between steps 205-206. From client computer 112, step 206 receives pull request 130 for status of transaction 170. Responsively and to client computer 112, step 207 sends status notification 150 and/or status 180 of transaction 170 based on information that was recorded in step 204 as explained above.

3.0 Example Client Request Formats

In various embodiments, client requests such as 120 or 130 may conform to one or more special formats 601-603 as shown in the following Table 1.

| Format | Meaning |
| --- | --- |
| 601 | Includes certificate |
| 602 | Includes filter criteria that matches many transactions |
| 603 | Conforms to a request format that the ledger computers can accept |

Format 601 includes a digital certificate and/or cryptographic signature for authentication and/or correlation to a blockchain or a block therein as discussed earlier herein. Format 602 includes filter criteria that potentially matches many transactions as discussed earlier herein.

Format 603 is somewhat universal and is acceptable to computers 140 and 191-192. For example, distributed system 100 need not initially contain tracker computer 140. When blockchain network 160 eventually becomes unable to sustain an ever increasing load, tracker computer 140 may be deployed to offload status delivery. Because computers 140 and 191-192 share format 603, client computers 111-112 can be reconfigured to interface with computer 140, instead of 191-192, with little impact to the codebases of client computers 111-112. In an embodiment, such reconfiguration consists of editing a property file to replace identifiers of ledger computers 191-192 with an identifier of tracker computer 140 such as a hostname, IP address, or URL.

4.0 Example Configurations of Tracker Computer

In various embodiments, tracker computer 140 may include one or more special configurations 611-614 as shown in the following Table 2.

| Configuration | Meaning |
| --- | --- |
| 611 | Transaction is recorded in a blockchain that is permissioned or permissionless |
| 612 | Distributed ledger does not include transaction |
| 613 | Status of transaction is: unconfirmed, canceled, or rejected |
| 614 | Tracking computer and ledger computer(s) share transaction database |
| 615 | Client computers and tracking computer are intermediated by an edge computer |

Configuration 611 monitors status of transactions that are recorded in respective blockchains of different kinds such as permissioned or permissionless. For example, same tracker computer 140 may monitor status of transactions in separate respective blockchain networks such as 160.

A permissionless blockchain is decentralized and may be anonymously used. For example, even ledger computers 191-192 may be anonymous and have varied ownership and/or varied amounts of availability and participation. A permissioned blockchain is more or less private, and ledger computers 191-192 authenticate tracker computer 140. Whether permissioned or permissionless, tracker computer 140 may or may not impose authentication upon client computers 111-112.

As explained earlier herein, ledger computers 191-192 may federate to provide a distributed ledger with much latency and some difficulty establishing a quorum. Thus, much time may elapse after submission of transaction 170 to blockchain network 160 and before transaction 170 is included in the distributed ledger as pending or finished, which configuration 612 accommodates. For example, transaction 170 may be initially recorded by tracker computer 140 long before eventually or never being recorded in the distributed ledger. For example, tracker computer 140 should not deny client requests 120 and 130 merely because: a) the distributed ledger does not indicate transaction 170, nor b) tracker computer 140 has nothing already recorded about transaction 170 such as when tracker computer 140 never received any status notification about transaction 170.

Likewise, transaction 170 may be retained by tracker computer 140 long after being finished and removed from the distributed ledger that may limit retention of finished transactions to some days, months, or years. For example per configuration 613, the status of transaction 170 may be canceled, rejected, or timed out such as according to a time to live, or may be pending such as unconfirmed.

Especially in a permissioned blockchain embodiment, tracker computer 140 and one, some, or all of ledger computers 191-192 may share a transaction database as an operational system of record per configuration 614. In an embodiment, tracker computer 140 receives status notification 150 that contains minimal information sufficient for tracker computer 140 to subsequently query the shared transaction database for complete information about transaction 170 and its status 180. In an embodiment, there is no status notification 150, and tracker computer 140 periodically queries the shared transaction database for recent status changes. Such embodiments may skip step 204 of FIG. 2.

To prevent tracker computer 140 from becoming a throughput bottleneck, tracker computer 140 may retain responsibility for interfacing with blockchain network 160 and for persisting transaction status, but offload responsibility for interfacing with client computers 111-112 to an edge computer per configuration 615. For example, tracker computer 140 and the edge computer may share a transaction status database. For example, many geographically distributed edge computers may share same tracker computer 140, and client computers 111-112 may interface with a least busy or geographically nearest respective edge computer.

5.0 Example Activities of Tracker Computer

In various embodiments, tracker computer 140 may perform one or more special activities 621-626 as shown in the following Table 3.

| Activity | Meaning |
| --- | --- |
| 621 | Track transactions recorded in a distinct respective type of blockchain |
| 622 | Reconfigure to track transactions recorded in a new type of blockchain |
| 623 | Authenticate a certificate or digital signature based on a blockchain that records the transaction |
| 624 | Authenticate a certificate or digital signature based on an external authentication server |
| 625 | Persist transaction status in: a database, a durable message queue, or a splittable file |
| 626 | Delete oldest transaction(s) in durable message queue |

Activity 621 tracks transactions occurring in different respective kinds of blockchains of same or different blockchain networks such as 160. For example, different blockchain types may have different formats for requesting and reporting transactions and their status. Embodiments may support blockchain types such as Ethereum and/or Hyperledger's Fabric.

Activity 622 provides future proofing. Activity 622 reconfigures to track transactions recorded in a new type of blockchain. For example, original deployment of tracker computer 140 may predate emergence of a the new blockchain type. In an embodiment, tracker computer 140 accepts pluggable codebase extensions, and each blockchain type may have its own such plugin.

Activity 623 authenticates a certificate or digital signature based on a blockchain that records transaction 170. For example, tracker computer 140 may reject client requests 120 and 130 if they contain an invalid certificate or digital signature. For example, the blockchain may contain a certificate that: matches the request's certificate, or is used to verify the digital signature. For example, the digital signature may have been created by client computer 111 using a private key to sign a copy of the blockchain certificate or to sign a message, such as subscription request 120, that contains the copy of the blockchain certificate.

For client requests 120 and 130, activity 624 delegates authentication of a certificate or digital signature to an authentication computer that is not tracker computer 140. For example, the authentication computer may facilitate federated identity, single sign on, and/or protocols such as security assertion markup language (SAML) and/or open authentication (OAuth).

Activity 625 persists transaction status in a database, a durable message queue, or a splittable file. A splittable file such as with Hadoop distributed filesystem (HDFS) may provide horizontal data partitioning that can reduce latency and increase throughput. For example, tracker computer 140 may load a needed partition on demand without loading other partitions. Likewise, tracker computer 140 may concurrently: write one partition while interfacing with blockchain network 160, and read another partition while interfacing with client computer 112.

Activity 626 leverages first in first out (FIFO) operation of a persistent message queue to delete old data. For example the queue may operate as a sliding retention window for a fixed amount of: transactions, transaction statuses, days, or bytes. For example when a new status notification is received, an oldest status notification may be deleted from the queue to make space for the new status notification. For example, appending data to one end of the queue may cause removal of data at the other end of the queue. In a fallback scenario if pull request 130 requests status data that was deleted from the queue (or database or file), then tracker computer 140 may delegate pull request 130 to blockchain network 160 which may or may not still have needed data.

6.0 Exemplary Tracker Computer

Figure 3:
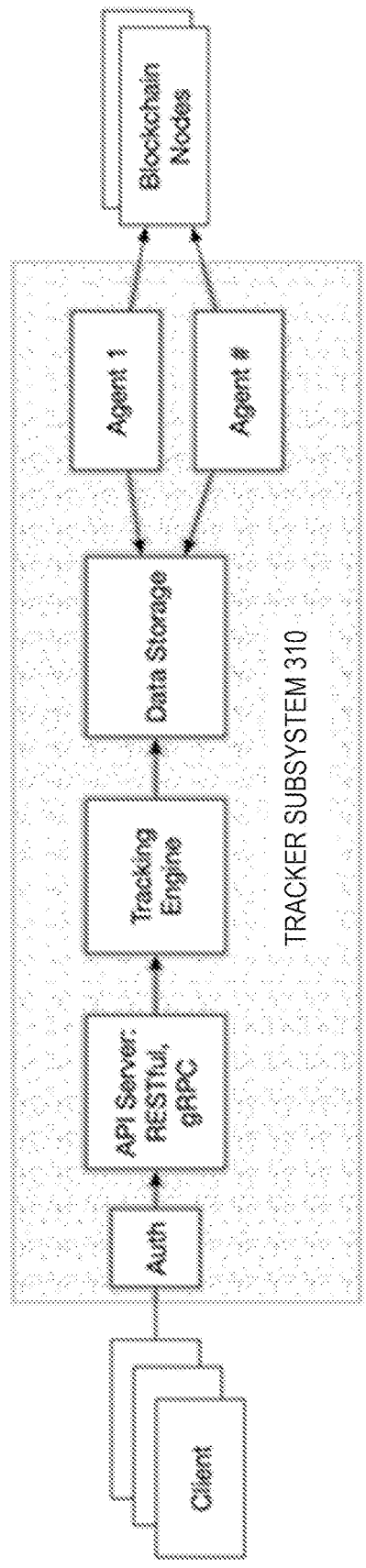
FIG. 3 is a block diagram that depicts an example distributed system that contains a tracker subsystem that may contain one or more computers.

FIG. 3 is a block diagram that depicts an example distributed system 300, in an embodiment. Distributed system 300 contains tracker subsystem 310 that may contain one or more computers as explained below. Distributed system 300 may be an implementation of distributed system 100. Tracker subsystem 310 may be an implementation of tracker computer 140.

Tracker subsystem 310 is an exemplary embodiment that may be based on embodiments presented earlier herein. Features of tracker subsystem 310 are not necessarily requirements of embodiments presented earlier herein. Shown within tracker subsystem 310 are boxes that represent components of tracker subsystem 310. Depending on the embodiment, some of those components may be separately hosted in their own computers, and some or all of those components may be hosted together on a same computer. Details of those components are as follows.

6.1 Authentication

The Authentication (shown as Auth) validates a client request and authorizes the request by checking whether the client is allowed to send the request. For certificate based cases, the Authentication may query a trusted certificate from the blockchain or external services.

6.2 API Server

The API server provides API service to parse a client request and retrieve required data from the Tracking Engine that is described below. The API Server constructs a correct response and sends the response back to the Client. The API Server may provide two types of APIs at the same time:

Simple RESTful APIs to allow request-response model; and

Streaming base APIs (e.g., gRPC) as the blockchain node, then the client can get event notifications with the same API from the original blockchain node, which will achieve transparency for the client side.

6.3 Tracking Engine

The tracking engine is the main part of the entire status workflow. The engine mainly manages the agents (presented below) and processes an authorized request from the API server. When a new ledger is started, the Tracking Engine spawns a blockchain agent to collect the transaction statuses from the ledger. Such spawning may create a lightweight thread, an operating system (OS) process, or a virtual machine such as a compute node in an elastic cloud.

The tracking engine manages information from the data storage (presented below), including extracting data and expiring data. For example, the tracking engine may query an unsuccessful transaction during a specific period, and can expire data that is older than 7 days.

6.4 Agents

Each blockchain agent collects transaction information for a respective type of ledger. There may be many agents to handle various types of blockchains. When supporting a new blockchain type, a new agent is deployed as an additional plugin to get information from a ledger computer. Some agents may be specialized for various status streaming APIs.

For a permissioned blockchain, an agent will collect information via an event service or a query API provided by a blockchain network's ledger computers. For example with Hyperledger Fabric (HLF), agent(s) register to an event service to receive filtered block events and store the transaction information into the shown local data storage.

For a permission-less blockchain, an agent parses recent blocks to inspect the transactions inside. Usually, the transaction status is successful, unsuccessful, or not-found.

6.5 Data Storage

Data Storage persists transaction information including identifier, status, and timestamp. Various kinds of durable storage are presented earlier herein. For high performance and resilience, data storage may have a distributed deployment that facilitates data redundancy such as for reliability availability and serviceability (RAS). Data storage does not need to support very large-scale volume in terms there enables expiration mechanism. Otherwise, should consider this large-scale requirement and prefer those supporting split-able storage tools.

6.6 Sample Rest HTTP Requests

The above API server may receive any of the following exemplary REST HTTP requests 1-3 that are examples demonstrating some usage of the RESTful APIs:

1. Query Specific Transactions' Status;
2. Query Transactions with Criteria;
3. Reporting Functionality;

6.6.1 Restful API: Query Specific Transactions' Status

In this example, a client seeks statuses of transactions a-c. No report parameters (e.g., URL, authentication and filter) are included in the following example REST HTTP request 1 that the client sends to the API server. The POST is JSON encoded.

```
POST https://api-service/v1/ledger/xxx/transactions
{
    timeout: 30s // Timeout to wait if the transactions succeed
    transaction-ids: [a, b, c]
    report-URL: ""
    report-authentication: ""
    report-filter: { }
}
```

The following is an example JSON encoded response that the API server sends to the client, including transaction identifiers and corresponding creation timestamps, and a response timestamp.

```
{
    transactions: [
        {
            id: "b",
            timestamp: 2019-08-08:00:00:00
        },
        {
            id: "c",
            timestamp: 2019-08-08:00:00:01
        }
    ]
    timestamp: 2019-08-08:00:01:00
}
```

6.6.2 Restful API: Query Transactions with Criteria

A client checks if there are unsuccessful transactions by sending the following example REST HTTP request 2 with URL-encoded parameters to the API server.

```
GET https://api-
service/v1/transactions?status=unsuccessful&since-timestap=2019-
08-08:00:00:00&end-timestamp=2019-08:00:01:00
```

The status of the given transactions are returned to the client by the API server in the following JSON encoded response.

```
{
    transactions: [
        {
            id: "b",
            timestamp: 2019-08-08:00:00:00
        },
        {
            id: "c",
            timestamp: 2019-08-08:00:00:01
        }
    ]
    timestamp: 2019-08-08:00:01:00
}
```

6.6.3 Restful API: Using the Reporting Functionality

In this example, a client sends to the API Server a subscription request such as the following JSON encoded REST HTTP request 3 that contains a regular expression as a transaction filter. The client subsequently listens on the report-URL to get status of transactions meeting the criteria in the transaction-filters parameters. The API server can automatically notify the client without requiring the client to do polling.

```
POST https://api-service/v1/ledger/xxx/transactions
{
    timeout: 30s // Timeout to wait if the transactions succeed
    transaction-filters: {
        id: abc* // regex can be supported optionally
    }
    report-URL: x.x.x.x/xxx/
    report-authentication: xxxxx
    report-filter: {status: unsuccessful}
}
```

In this case, the client does not need to send another request later to check whether there's unsuccessful transactions. The API server will send updates to the report-URL, which may automatically update the client's local database.

6.7 Streaming API: Using GRPC

For a streaming API such as with Google remote procedure call (gRPC) for HTTP/2, subscription and filtration semantics are similar to the above REST example. In a Hyperledger Fabric example, the remote API may be defined in the Go language as follows.

```
type DeliverClient interface {
    // deliver first requires an Envelope of type
    ab.DELIVER_SEEK_INFO with
    // Payload data as a marshaled orderer.SeekInfo message,
    // then a stream of block replies is received
    Deliver(ctx context.Context, opts ...grpc.CallOption)
    (Deliver_DeliverClient, error)
    // deliver first requires an Envelope of type
    ab.DELIVER_SEEK_INFO with
    // Payload data as a marshaled orderer.SeekInfo message,
    // then a stream of filtered block replies is received
    DeliverFiltered(ctx context.Context, opts ...grpc.CallOption)
    (Deliver_DeliverFilteredClient, error)
}
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
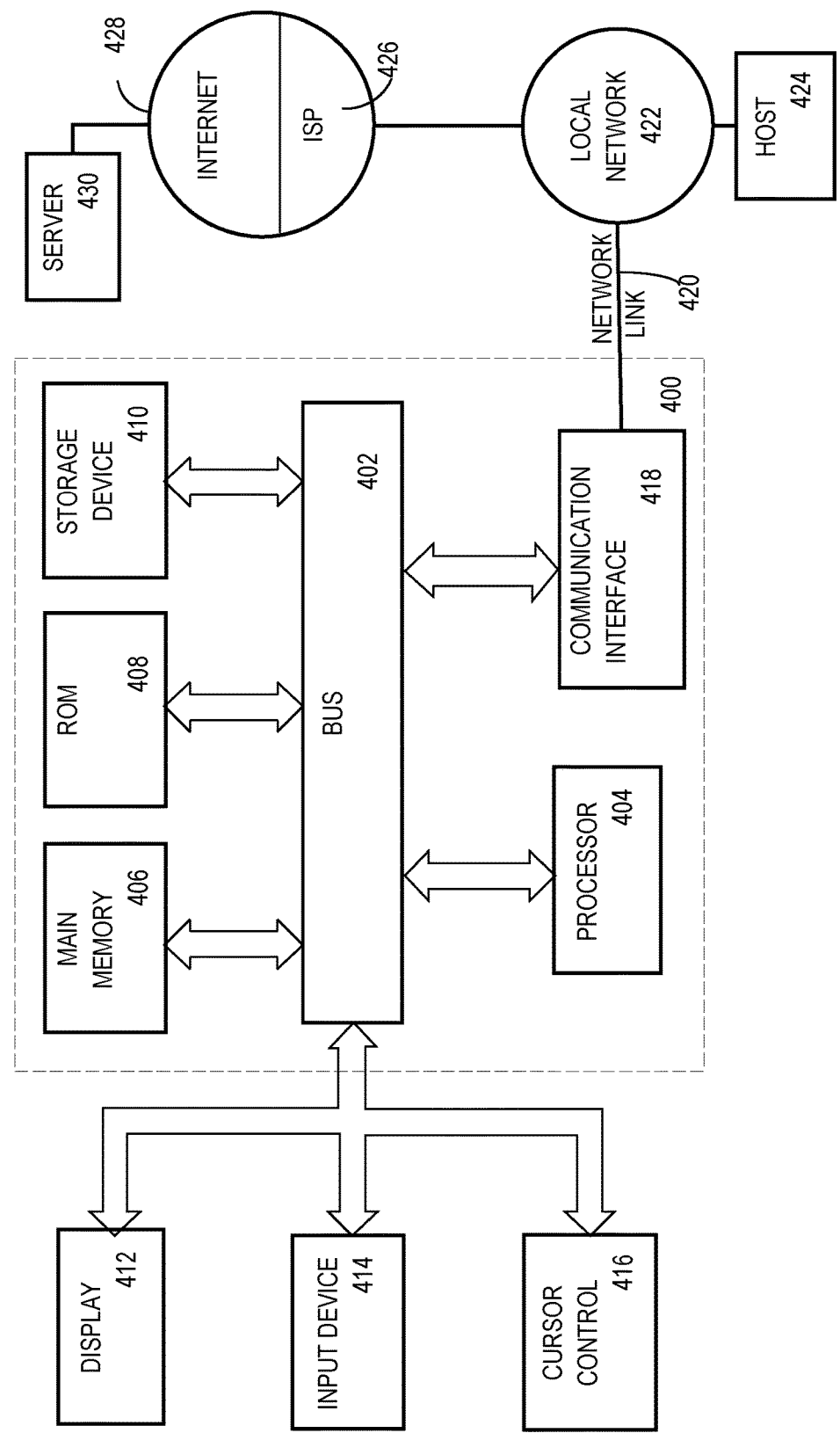
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
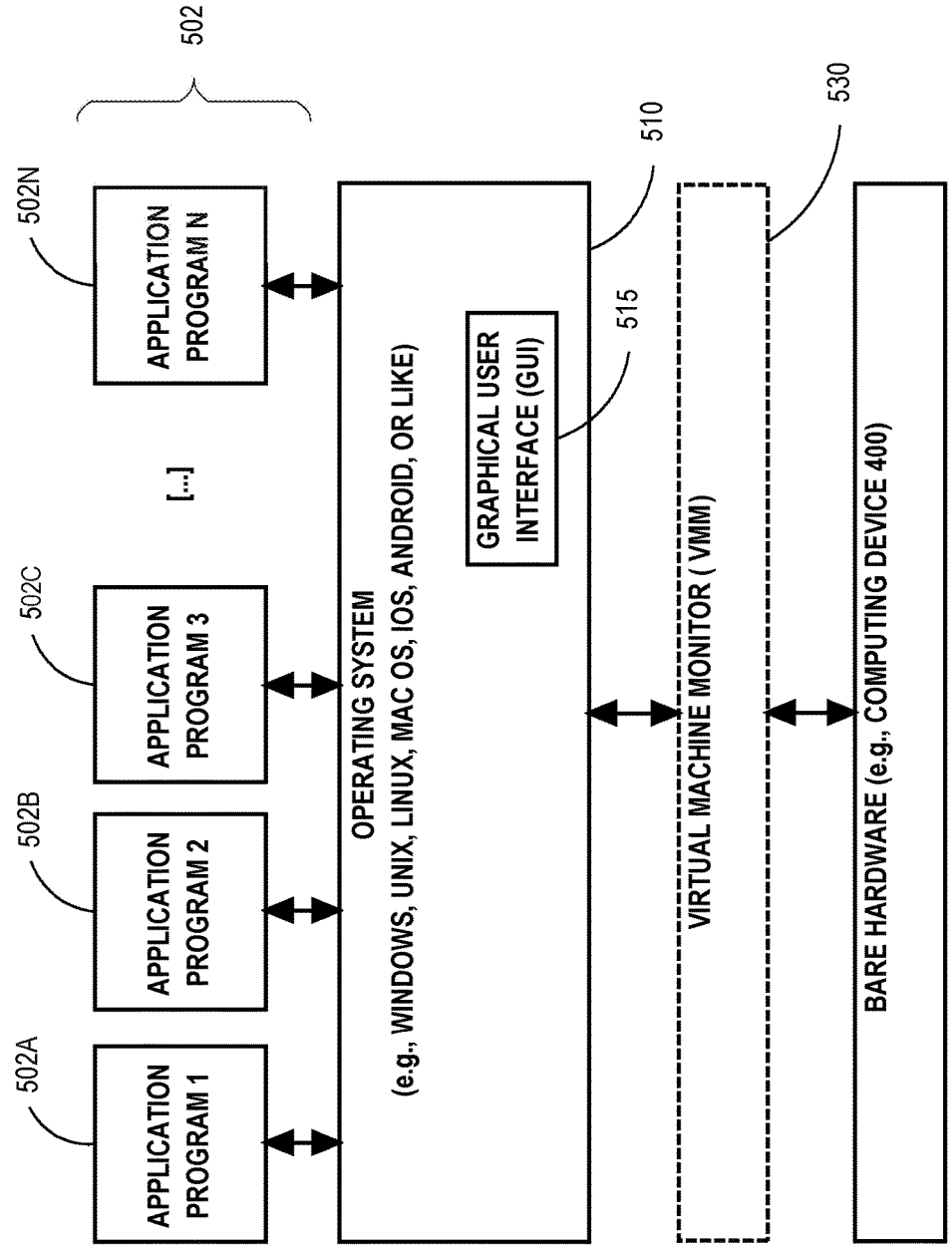
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
receiving, by a tracker computer and from a plurality of ledger computers that does not include the tracker computer, a status notification that indicates a status of a transaction in a blockchain network that comprises the plurality of ledger computers, wherein:
the plurality of ledger computers contain a distributed ledger,
the tracker computer does not contribute content for inclusion in: the distributed ledger, the transaction, and a blockchain that records the transaction;
recording said status of the transaction by the tracker computer in response to the status notification that indicates said status of the transaction;
receiving, by the tracker computer from a client computer, a pull request for status of the transaction in the blockchain network, wherein the pull request for status of the transaction contains:
a digital certificate or cryptographic signature, and
one or more filter criteria for the transaction that specify at least one selected from the group consisting of: at least one identifier of a block or a blockchain, a time or a time period of transaction submission, a time or a time period of transaction status change, at least one transaction status, and a party identifier;
authenticating, based on a certificate of said blockchain that records the transaction, said digital certificate or cryptographic signature in the pull request;
matching the one or more filter criteria to the transaction; and sending, to the client computer, by the tracker computer and in response to said receiving the pull request for status of the transaction, said status of the transaction based on said recording said status of the transaction by the tracker computer.

2. The method of claim 1 wherein:
the tracker computer can track transactions recorded in a plurality of types of blockchains;
the method further comprises reconfiguring the tracker computer for tracking transactions recorded in a type of blockchain that is not included in the plurality of types of blockchains.

3. The method of claim 1 wherein the method further comprises authenticating, by an authentication server that is not hosted on the tracker computer, an identity.

4. The method of claim 1 wherein the pull request includes filter criteria that matches a plurality of transactions that includes the transaction.

5. The method of claim 1 wherein said recording said status of the transaction by the tracker computer comprises storing said status of the transaction in a splittable file.

6. The method of claim 1 further comprising deleting an oldest transaction in a durable message queue.

7. The method of claim 1 wherein the pull request conforms to a request format that the plurality of ledger computers can accept.

8. The method of claim 1 wherein
said status of the transaction is timed out.

9. The method of claim 1 wherein the tracker computer shares, with an edge computer, a database that records at least one selected from the group consisting of transactions and transaction statuses.

10. One or more non-transitory computer-readable media storing instructions that, when executed by one or more processors, cause:
receiving, by a tracker computer and from a plurality of ledger computers that does not include the tracker computer, a status notification that indicates a status of a transaction in a blockchain network that comprises the plurality of ledger computers, wherein:
the plurality of ledger computers contain a distributed ledger,
the tracker computer does not contribute content for inclusion in: the distributed ledger, the transaction, and a blockchain that records the transaction;
recording said status of the transaction by the tracker computer in response to the status notification that indicates said status of the transaction;
receiving, by the tracker computer from a client computer, a pull request for status of the transaction in the blockchain network, wherein the pull request for status of the transaction contains:
a digital certificate or cryptographic signature, and
one or more filter criteria for the transaction that specify at least one selected from the group consisting of: at least one identifier of a block or a blockchain, a time or a time period of transaction submission, a time or a time period of transaction status change, at least one transaction status, and a party identifier;
authenticating, based on a certificate of said blockchain that records the transaction, said digital certificate or cryptographic signature in the pull request;
matching the one or more filter criteria to the transaction; and
sending, to the client computer, by the tracker computer and in response to said receiving the pull request for status of the transaction, said status of the transaction based on said recording said status of the transaction by the tracker computer.

11. The one or more non-transitory computer-readable media of claim 10 wherein:
the tracker computer can track transactions recorded in a plurality of types of blockchains;
the instructions further cause reconfiguring the tracker computer for tracking transactions recorded in a type of blockchain that is not included in the plurality of types of blockchains.

12. The one or more non-transitory computer-readable media of claim 10 wherein the instructions further cause authenticating, by an authentication server that is not hosted on the tracker computer, an identity.

13. The one or more non-transitory computer-readable media of claim 10 where in the pull request includes filter criteria that matches a plurality of transactions that includes the transaction.

14. The one or more non-transitory computer-readable media of claim 10 wherein said recording said status of the transaction by the tracker computer comprises storing said status of the transaction in a splittable file.

15. The one or more non-transitory computer-readable media of claim 10 wherein the instructions further cause deleting an oldest transaction in a durable message queue.

16. The one or more non-transitory computer-readable media of claim 10 wherein: the pull request conforms to a request format that the plurality of ledger computers can accept.

17. The one or more non-transitory computer-readable media of claim 10 wherein
said status of the transaction is timed out.

18. The one or more non-transitory computer-readable media of claim 10 wherein the tracker computer shares, with an edge computer, a database that records at least one selected from the group consisting of transactions and transaction statuses.

* * * * *